(12) United States Patent
Stux et al.

(10) Patent No.: US 8,501,352 B2
(45) Date of Patent: Aug. 6, 2013

(54) LITHIUM-METAL-OXIDE COMPOSITE ELECTRODES

(75) Inventors: Arnold Stux, Washington, DC (US); Karen Lyons, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 841 days.

(21) Appl. No.: 11/307,367

(22) Filed: Feb. 3, 2006

(65) Prior Publication Data

US 2007/0184347 A1 Aug. 9, 2007

(51) Int. Cl.
*H01M 4/48* (2010.01)
*H01M 4/52* (2010.01)

(52) U.S. Cl.
USPC .............. 429/231.3; 429/231.1; 429/232

(58) Field of Classification Search
USPC .......... 429/231.1, 231.3, 232; 252/182.1
See application file for complete search history.

(56) References Cited

U.S. PATENT DOCUMENTS

| 5,744,258 A * | 4/1998 | Bai et al. ................. 429/3 |
| 6,908,710 B2 * | 6/2005 | Barker et al. ........... 429/231.9 |
| 2005/0105247 A1 | 5/2005 | Lee et al. |

FOREIGN PATENT DOCUMENTS

WO WO 97/01191 * 1/1997

OTHER PUBLICATIONS

Stux et al., "Li-Ion Capacity Enhancement in Composite Blends of $LiCoO_2$ and $Li2RuO_3$," *J. Electrochem. Soc.*, 152(10), A2009 (2005).
Stux et al., "$Li_2RuO_3$ as an Additive to $LiCoO_2$," 206th Electrochemical Society Meeting (Oct. 5, 2004).
Thackery et al., "Advances in manganese-oxide 'composite' electrodes for lithium-ion batteries" *J. Mat. Chem.*, 2005, 15, 2257.
Moore et al., "The electrochemical behavior of $xLiNiO_2 \cdot (1-x)Li_2RuO_3$ and $Li_2Ru_{1-y}Zr_yO_3$ electrodes in lithium cells" *J. Power Sources*, 119-121 (2003) 216.
Swider et al., "Synthesis of Ruthenium Dioxide-Titanium Dioxide Aerogels: Redistribution of Electrical Properties on the Nanoscale" *Chem. Mater.* 1997, 9, 1248.

* cited by examiner

*Primary Examiner* — Tracy Dove
(74) *Attorney, Agent, or Firm* — Amy L. Ressing; Joseph T. Grunkemeyer

(57) ABSTRACT

A composite material having: particles of a first lithium-metal oxide compound, particles of a conductive second lithium-metal oxide compound, a conductive matrix, and a polymeric binder.

6 Claims, 6 Drawing Sheets

LITHIUM-METAL-OXIDE COMPOSITE ELECTRODES

FIELD OF THE INVENTION

The invention relates generally to lithium-metal-oxide (Li-M-O) composite materials and batteries.

DESCRIPTION OF RELATED ART

Many commercial Li-ion batteries use $LiCoO_2$ or a partially substituted variation as the insertion material at the positive electrode. These layered structures have chemical and electrochemical stability (Tarragon et al., Nature (London), 414, 359 (2001); Manthiram et al., Recent Res. Dev. Electrochem., 2, 31 (1999); all referenced publications and patent documents are incorporated herein by reference), relatively high capacity of approximately 140 mAh/g, and a discharge plateau of 3.8 V. Modern electronic applications increasingly demand more specific energy, motivating researchers to further increase the capacity of $LiCoO_2$. Several strategies exist for improving the capacity of $LiCoO_2$, such as using a carbon coating to increase electronic conductivity (Cushing et al., Solid State Sci., 4, 1487 (2002)). In addition, metal oxide coatings, such as $Al_2O_3$, MgO, and $SnO_2$, and the heating methods used to apply the coatings, can enhance the capacity and capacity retention of $LiCoO_2$ (Wang et al., Solid State Ionics, 148, 335 (2002); Chen et al., Electrochem. Solid-State Lett, 6, A221 (2003)). Also, coating lithium metal oxides with other active insertion materials has resulted in some increase in capacity (Cho et al., Electrochem. Solid-State Lett., 2, 253 (1999); Kannan et al., Electrochem. Solid-State Lett., 6, A16 (2003)).

BRIEF SUMMARY OF THE INVENTION

The invention comprises a composite material comprising: particles of a first lithium-metal-oxide compound, particles of a low-impedance or conductive second lithium-metal oxide compound, a conductive matrix, and a polymeric binder.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

As referred to herein compounds such as $LiCoO_2$ include the precise compound mentioned as well as non-stoichiometric compounds of the same family, as understood by those of skill in the art.

Figure 3:
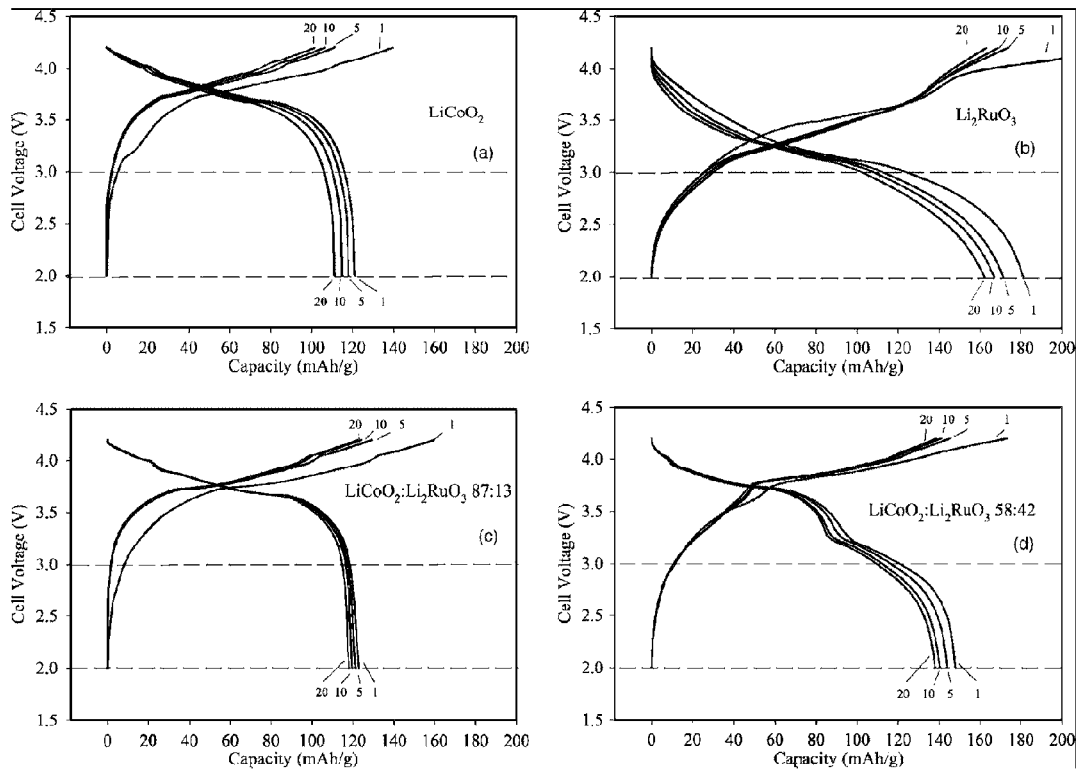
FIG. 3 shows charge-discharge characteristics for cycles 1, 5, 10, and 20 of Li-ion cells at C/5 rate and electrodes containing (a) $LiCoO_2$, (b) $Li_2RuO_3$, (c) physical mixtures of 87:13 w/w $LiCoO_2$ and $Li_2RuO_3$, and (d) 58:42 w/w $LiCoO_2$ and $Li_2RuO_3$.

The specific capacity and energy of batteries with $LiCoO_2$ electrodes may be improved by the addition of $Li_2RuO_3$ to the cathodes, particularly at high rates. $LiCoO_2$ is a standard active material used in Li-ion batteries, and $Li_2RuO_3$ is a highly stable Li-insertion compound with high electronic and Li-ion conductivity. Batteries with $LiCoO_2$ and $Li_2RuO_3$ cathodes are compared to those with blends of the two active materials when discharged from 4.2 to 2.0 V at C/5 and 2C rates in FIGS. 3 and 4. The Li-ion batteries with a 58:42 w/w $LiCoO_2/Li_2RuO_3$ blend have a disproportionate increase of 25 and 36%, respectively, in their expected specific capacity and energy relative to $LiCoO_2$ when the batteries are charged and discharged at a 2C rate. X-ray diffraction of the electrodes at a high rate of charge confirms that the $LiCoO_2$ and $Li_2RuO_3$ phases remain distinct in the electrodes. Analysis of the discharge curves in combination with electrochemical impedance spectroscopy shows that $Li_2RuO_3$ lowers the electrical resistance of the electrodes when combined in parallel with the $LiCoO_2$. This simple approach may be used to improve the capacity of Li-ion batteries for high rate applications.

The electrochemical reactions may be as shown below:

The ingredients of the composite material may be combined in an any manner known in the art that retains the lithium-metal oxide compounds as separate particles. The compounds are not in a solid solution. The first lithium-metal oxide compound may, for example, have a resistivity that is higher than that of the second lithium-metal oxide compound and may be at least about 500 Ω·cm. Suitable first lithium-metal oxide compounds include, but are not limited to, $LiCoO_2$, $LiFePO_4$, $LiMn_2O_4$, $LiNiO_2$, $LiCo_xMn_yNi_{(1-x-y)}O_2$, and combinations thereof. The second lithium-metal oxide compound may, for example, have a resistivity of no more than about 20, 50, 100, or 500 Ω·cm. Suitable second lithium-metal oxide compounds include, but are not limited to, $Li_2RuO_3$ and $LiMoO_2$.

Any weight ratio of first lithium-metal oxide compound to second lithium-metal oxide compound may be used, including but not limited to, about 10:90 to about 50:50, to about 90:10.

Suitable conductive matrices include, but are not limited to, carbon black. Suitable polymeric binders include, but are not limited to, polyvinylidene fluoride.

An electrode may be made comprising the composite material using techniques disclosed herein or any other method known in the art for forming electrodes. The electrode may be the cathode of a battery also comprising an anode and a lithium ion permeable separator between the cathode and anode. The construction of such batteries is known in the art. The battery may power a device by connecting a load to the anode and cathode.

Lithium ruthenium oxides may also be useful for Li-ion battery cathodes because they possess low electronic resistivity and exhibit facile $Li^+$ insertion properties (Kobayashi et al. *Solid State Ionics*, 86-88, 859 (1996)). $Li_2RuO_3$ reversibly intercalates $Li^+$ with high theoretical volumetric capacity (Moore et al., *J. Power Sources*, 119-121, 216 (2003)) and has two separate intercalating phases with voltage plateaus of 3.6 and 3.4 V. Despite its monoclinic symmetry, $Li_2RuO_3$ is isostructural to the cubic, layered $LiCoO_2$, and $LiNiO_2$ compounds (Kobayashi et al., *Solid State Ionics*, 82, 25 (1995)). Research has shown that lithium ruthenates synthesized by wet chemistry techniques yield inefficient first charge/discharge cycles but then exhibit high capacity retention with cycling. The advantageous attributes of both $LiCoO_2$ and $Li_2RuO_3$ may be leveraged when the two materials are combined in the positive electrode of a battery (Moore et al., *J. Power Sources*, 119-121, 216 (2003)).

The addition of 42 wt % $Li_2RuO_3$ to $LiCoO_2$ may result in a disproportionate increase in specific capacity and specific energy of $LiCoO_2$, particularly at 2C rates. The benefit of adding $Li_2RuO_3$ to $LiCoO_2$ is clearly displayed when the specific energy is calculated from integration of the discharge curves, where an expected improvement in capacity (~21%) is observed at a C/5 rate (FIG. 3($d$)) due to the higher capacity of the $Li_2RuO_3$. The discharge profiles of the electrode comprising the 58:42 $LiCoO_2$:$Li_2RuO_3$ blend simply appear to be a combination of the $LiCoO_2$ and $Li_2RuO_3$ electrodes. An unexpected 40% increase in capacity is measured at a 2C rate (FIG. 4($d$)), and the $Li_2RuO_3$ significantly affects the discharge profiles of $LiCoO_2$/$Li_2RuO_3$ electrodes at this rate, as illustrated in FIG. 5. The 3.7 V plateau is seen in the 87:13 blend, and is pronounced in the 58:42 blend. The extended voltage plateau results in the high specific energy calculated for the 58:42 blend vs. $LiCoO_2$ (411 vs. 301 mWh/g). Also, the specific capacity of the $LiCoO_2$ component at the 3.7 V plateau of the 58:42 blend does not vary appreciably with cycling rate and is near 80 mAh/g for the C/5 and 2C rates (FIGS. 3($d$) and 4($d$)).

The following mechanisms are for the purpose of explanation. They are not limiting of the appended claims. A chemical interaction between the $LiCoO_2$ and $Li_2RuO_3$ was considered as the source of the anomalies in the capacities, but such a mechanism was rejected, because 1) the XRD shows no evidence of changes to the materials structure when they are in the blended electrodes, and 2) the capacity increases with decreasing discharge time, following the opposite trend to that expected from kinetics.

It is proposed that the increased capacity of the blended $LiCoO_2$:$Li_2RuO_3$ cathode is due to the lower resistance of the $Li_2RuO_3$; the resistivity of $Li_2RuO_3$ is 10 Ω·cm and that of $LiCoO_2$ is between 1000 and 10,000 10 Ω·cm. (Menetrier et al., *J. Mater Chem.* 9, 1135 (1999); Takahashi et al. *J. Solid State Chem.*, 164, 1 (2002)). This hypothesis was explored first by modeling the composite cathode as two resistors in parallel. The actual cell voltage is the difference between the open circuit potential or redox voltage and the sum of the activation polarization, concentration polarization, and IR loss. Assuming the IR loss contributes the most to the difference between real and ideal open-circuit potential, internal IR losses can be determined from the discharge profiles and by impedance spectroscopy.

First, in the discharge profiles, the resistance is calculated from discharge curves via Ohm's law using the discharge current and the difference between the actual and ideal cell redox voltages. An ideal cell voltage of 3.87 V is used for the $LiCoO_2$-containing compounds because it is considered the redox potential for $Li^+$ insertion in $LiCoO_2$ determined by differential capacity. (Barker et al., *Electrochim. Acta*, 41, 2481 (1996)). A value of 3.4 V is used as the ideal cell voltage for the $Li_2RuO_3$. However, this applies only to a low state of charge such as beyond 60 mAh/g because a second higher voltage plateau at 3.6 had been reported for discharge to less than 50 mAh/g. (Kobayashi et al., *Solid State Ionics*, 82, 25 (1995). The voltage of the actual cells is determined from the discharge curves at a selected capacity of 70 mAh/g in FIG. 5. The resistances of the single-component electrodes are calculated directly from the differences between the actual and ideal voltages, and the resistance of the blends is calculated from Eq. (1) for parallel resistors $$\frac{1}{R_{blend}} = + \frac{1}{R_{LiCoO_2}}(vol\%_{LiCoO_2}) + \frac{1}{R_{Li_2RuO_3}}(vol\%_{Li_2RuO_3}) \quad (1)$$

The weight percent of the materials is an adequate approximation because the densities of the oxides are similar. The blend has 58% $LiCoO_2$, and substituting the proportions by weight gives $$\frac{1}{R_{blend}} = 0.58\left(\frac{1}{R_{LiCoO_2}}\right) + 0.42\left(\frac{1}{R_{Li_2RuO_3}}\right) \quad (2)$$

Figure 6:
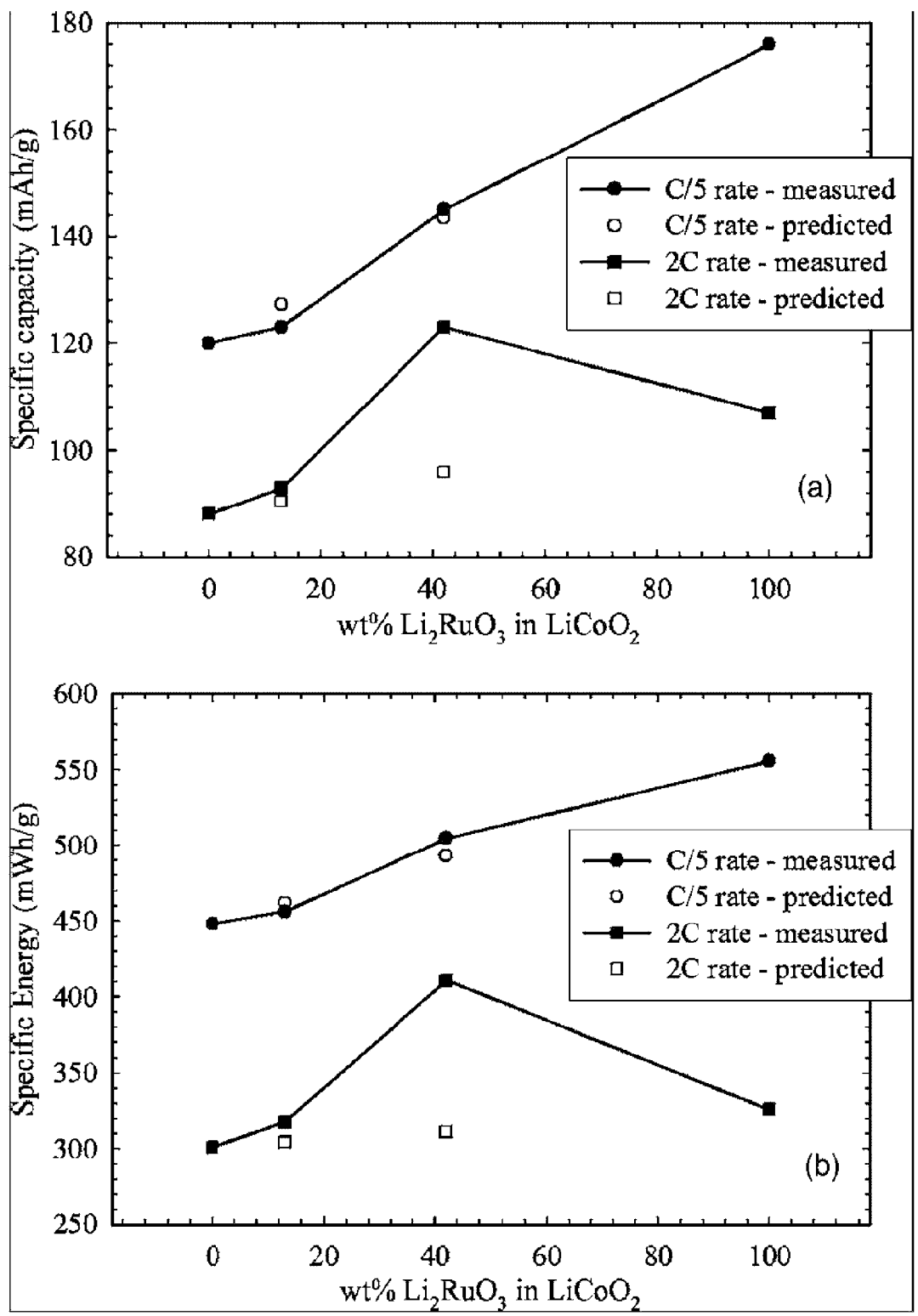
FIG. 6 shows (a) specific capacity and (b) specific energy of Li-ion cells cycled at C/5 and 2C rates as a function of $Li_2RuO_3$ wt % in composite electrodes with $LiCoO_2$. The predicted values are calculated from the weighted fractions of the specific capacities and energies of the pure materials

From the data in FIG. 6, at 70 mAh/g, the voltage drops on the curve are calculated from 3.87 V for $LiCoO_2$ and the blend and from 3.4 V for $Li_2RuO_3$ (Table IV).

Because the effect reported here may rely on optimization of percolation networks or connectivity, it is likely that adjustments to the materials' particle size, morphology, and their relative concentration (or volume) can be made to further improve the performance of the electrodes. The use of nanoparticles in the blends may also improve the performance as ionic conductivity can increase with decreasing particle size, although the electronic conductivity may decrease (Swider et al. *Chem. Mater.*, 9, 1248 (1997)). It may be valuable to use other lithiated transition metals, such as Mn, Ti, Sn, Zr, or Mo, which are structurally equivalent to $Li_2RuO_3$. Combinations with a redox potential greater than 3.0 V may be used, so that the $LiCoO_2$ structure is not stressed by discharge to low voltages. One suitable combination may be $LiFePO_4$: $LiMoO_2$. Table I shows the theoretical capacities of some materials.

TABLE I

| Material | Highest voltage (V) | Theoretical capacity (mAh/g) |
| --- | --- | --- |
| $LiCoO_2$ | 3.87 | 140 |
| $Li_2RuO_3$ | 3.6 | 200 |
| $LiMoO_2$ | 3.3 | 200 |
| $LiFePO_4$ | 3.6 | 170 |

The enhancement of the specific capacity and energy of batteries by the addition of $Li_2RuO_3$ to $LiCoO_2$ has been demonstrated, particularly at high cycling rates. This effect is observed even though the materials are utilized discretely in the cells and have no apparent chemical interaction. The IR losses in the discharge profiles and impedance spectroscopy show that the blended electrodes are effective because their parallel combination lowers the cell resistance, which decreases the IR drop and increases the capacity.

$Li_2RuO_3$ may be useful for microbattery applications, in which its high cost will have little impact. Furthermore, microbatteries are typically sought for microdevices, and having a battery with the capability to perform well at high rates may allow the use of a single battery vs. a battery/capacitor combination.

Having described the invention, the following examples are given to illustrate specific applications of the invention. These specific examples are not intended to limit the scope of the invention described in this application.

Example 1

$LiCoO_2$:$Li_2RuO_3$

Materials—$Li_2RuO_3$ was synthesized by mixing commercially available powders of $RuO_2$ and lithium carbonate ($Li_2CO_3$) following previously described guidelines. (Moore et al., *J. Power Sources*, 119-121, 216 (2003); Kobayashi et al., *Solid State Ionics*, 82, 25 (1995)) Briefly, hydrous $RuO_2$ (Alfa Aesar) was dried at 400° C. for 18 h to remove structural water. Afterwards, the $RuO_2$ was ground together with an equimolar amount of $Li_2CO_3$ (Alfa Aesar), pelletized, and sintered in air at 950° C. for 24 h. The pellets were then pulverized using an agate mortar and pestle and sieved to 30 μm. To confirm a consistent synthetic process, each batch of $Li_2RuO_3$ was characterized by differential thermal analysis (TGA/DTA; Rheometric Scientific) and XRD (Cu Kα radiation; Bruker D8 Advance). The particle morphology was surveyed with SEM (Leo Supra 55). Commercially available $LiCoO_2$ was used as the standard cathode active material.

Cathodes were made of $LiCoO_2$, $Li_2RuO_3$, or $LiCoO_2$-rich mixtures of the two. One blend was a 2.3:1.0 $LiCoO_2$:$Li_2RuO_3$ molar ratio (which is approximately a 58:42 w/w mixture) and another was 11.5:1.0 (approximately 87:13 w/w).

Electrode fabrication—The active materials were formulated into inks using previously developed recipes. (Wartena et al. *J. Power Sources*, 126, 193 (2004) The cathode inks were a mixture of approximately 91 wt % active cathode material, 2% Super P carbon (Ensaco), 4% KS6 carbon (Timcal), and 3% polyvinylidene fluoride (PVDF, Atofina). The carbon additives were ground with the active material or stirred in the slurry. The PVDF was dissolved separately in 1-methyl-2-pyrrolidone (NMP, Aldrich) and then combined with the active material/carbon powders to make a viscous ink for efficient deposition. For the Li-ion cells, anode inks were made from 90% mesoporous carbon microbeads (MCMB 25-28; Alumina Trading Co.), 1.5% Super P carbon, and 8.5% PVDF dissolved in NMP. An additional ink was prepared from 10% Super P carbon and 90% PVDF in NMP to serve as a conductive coating and adhesion layer to the current collectors.

The inks were deposited by hand on current collectors of aluminum and copper foils (All-Foils, Inc.) approximately 4×4 mm in area. The foils were pretreated by etching with 1 M potassium hydroxide and nitric acid solutions, respectively, followed by rinsing with water and then acetone. A layer of the conductive carbon ink was then added to their surfaces. The conductive coating/adhesion layer was dried on a hot plate at the lowest heat setting for approximately 1 min in order to obtain a homogeneous film. The anode and cathode inks were then spread onto the carbon-coated Cu and Al foils, respectively. The electrodes were subsequently dried again on the hotplate, and then vacuum-dried overnight at 90 to 95° C. before transferring to an argon-filled glove box. The electrodes were not calendered or pressed.

Electrochemical investigation—The cathode materials were evaluated in both Li-metal and Li-ion cells at room temperature. The cells with Li-metal anodes were made by pressing the cathodes against a glass fiber membrane and a Li foil using stainless steel rods in a T-shaped polypropylene connector (Swagelok, i.d.=6.4 mm). The liquid electrolyte was dripped onto the glass fiber prior to final assembly. The electrolyte was 1 M $LiPF_6$ in a mixture of carbonates containing ethylene carbonate, propylene carbonate, ethyl methyl carbonate, and diethyl carbonate.

Li-ion microbatteries, or small packaged cells, were assembled using the procedures described previously. (Wartena et al., *J. Power Sources*, 126, 193 (2004). The separator, a microporous polymer film (Celgard 2730), was sandwiched between the $LiCoO_2$/carbon/aluminum and MCMB/carbon/copper electrodes. The cathode/separator/anode sandwiches were first held together by impulse sealing them in a transparent polymer bag (Saranex SX 23-P), followed by sealing in another pouch of a trilayer polyethylene-aluminum-polyester. During the sealing process, small holes were left in the polymer seals to allow electrolyte injection. After the battery was filled with the electrolyte, the pouch was fully sealed. With this packaging process, the Li-ion batteries were protected from ambient air and gently held together with no additional pressure on the electrodes.

The electrochemical testing of Li-ion cells was conducted using a battery tester (Maccor 2300) set to cutoff voltages of 2.0 and 4.2 V for discharge and charge, respectively, and at constant currents at rates ranging from 2C to C/20, corresponding to current densities of 2.0-0.15 mA/cm². The focus was on experiments at 2C and C/5 rates, or discharge times of 30 min and 5 h, respectively. The test current densities were adjusted according to the total mass of active material(s), and the specific capacities initially measured for $LiCoO_2$ (122 mAh/g) and $Li_2RuO_3$ (140 mAh/g). The weight of the active materials in the cathodes ranged from 0.5 to 1.5 mg but had little impact on the electrode appearance and specific capacity. For the blends, appropriate currents were determined by normalizing the weighted averages of the single-component specific capacities.

Impedance measurements were carried out in ambient air on packaged microbattery cells with cathodes containing LiCoO$_2$, Li$_2$RuO$_3$, or 58:42 w/w LiCoO$_2$:Li$_2$RuO$_3$. The cells were scanned from 20,000 to 2 Hz with a 10 μA amplitude ac current using a frequency response analyzer and electrochemical interface (Solartron 1253/1286) controlled by commercially available software (ZPlot, Scribner). Cells were then discharged and charged at 2C or C/5 currents, with the cycles periodically interrupted for additional EIS measurement between 4.0 and 3.0 V. Circular fits were applied to the curves of relevant data points, and resistance values were calculated using ZPlot. The circular fits of the data were chosen based on an optimization of the tradeoff between the maximum number of data points and the minimum deviation of the fit from the data.

Materials characterization after cycling—XRD was used to check for any cycle-based structural changes in the various blends and single-component cathodes in the metallic Li cell due to cycling. The cells were cycled five times, charged, and then slightly discharged to 4.15 V, where they were held for 1 h to monitor any unexpected voltage drops. The deintercalated cathodes were then removed from the metallic Li cell while still in the glove box and clamped between Kapton sheets in a holder for the diffractometer. The encapsulated cathodes were then removed from the glove box and analyzed in the XRD with low resolution scans, using a step size of 0.01° 2θ and a step time of 3 s.

Figure 1:
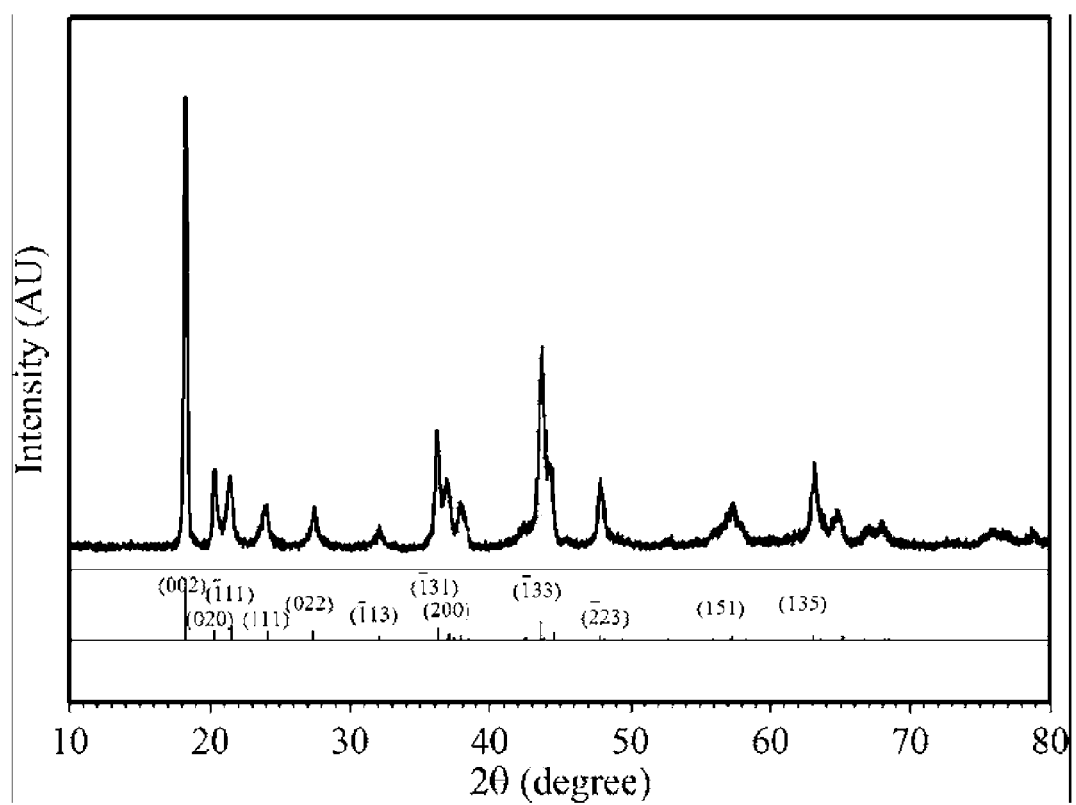
FIG. 1 shows a powder XRD pattern of $Li_2RuO_3$. The indices of the JCPDS pattern for Li2RuO3 (no. 85-2000) are shown by annotation.

Results—The XRD of the synthesized Li$_2$RuO$_3$ is shown in FIG. 1 and matches well to the JCPDS pattern for Li$_2$RuO$_3$ (no. 85-2000) as well as patterns in the literature. (Dulac, C. R. *Seances Acad. Sci.*, Ser. B, 270, 223 (1970); James et al. *J. Solid State Chem.*, 74, 287 (1988)). The monoclinic structure of Li$_2$RuO$_3$ and the ordered nature of its LiRu$_2$ planes have been used to explain the high reversibility of Li$^+$ insertion into Li$_2$RuO$_3$.

Scanning electron micrographs for LiCoO$_2$ and Li$_2$RuO$_3$ show that the LiCoO$_2$ features 3-μm particles in 10-μm agglomerates while the Li$_2$RuO$_3$ has 1-μm particles in 10-μm agglomerates. The comparable sizes of the two compounds should foster intimate contact with each other and the carbon while allowing for electrolyte accessibility.

Figure 2:
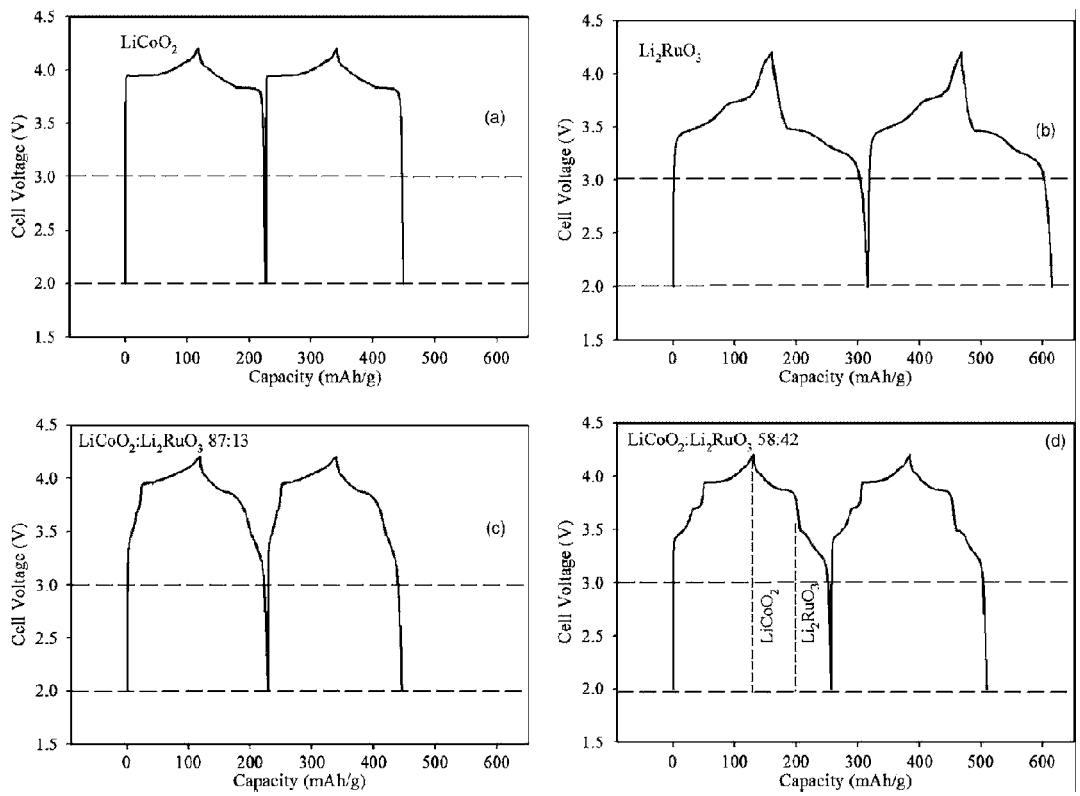
FIG. 2 shows second and third charge-discharge cycles for positive electrodes in metallic Li cells cycled between 2.0 and 4.2 V at a C/5 rate. The composition of the active material in the cathode was varied: (a) $LiCoO_2$, (b) $Li_2RuO_3$, (c) 87:13 w/w $LiCoO_2$ and $Li_2RuO_3$, and (d) 58:42 w/w $LiCoO_2$ and $Li_2RuO_3$.

The second and third cycles at a C/5 rate are shown for the four different cathodes vs. Li metal in FIG. 2 as a function of specific capacity. Their specific capacities (mAh/g) and specific energies (mWh/g), as derived from the second cycle discharge curve, are reported in Tables II and III. The LiCoO$_2$ has a single plateau at approximately 3.8 V on charge and 3.7 V on discharge (FIG. 2(a)), values consistent with the literature. The charge-discharge curves for the Li$_2$RuO$_3$ in FIG. 2(b) are similar to those previously described with plateaus at 3.4 and 3.6 V on charge and 3.4 and 3.2 V on discharge. (Kobayashi et al., *Solid State Ionics*, 82, 25 (1995)). These data also support prior observations that, while Li$_2$RuO$_3$ has a lower voltage plateau, it has a higher specific capacity than LiCoO$_2$. As determined from the second discharge from 4.2 to 2.0 V, the specific capacities are 104 mAh/g for LiCoO$_2$ and 136 mAh/g for Li$_2$RuO$_3$.

TABLE II

Capacities measured from the second discharge cycle of Li-metal and Li-ion cells with different cathode compositions at C/5 and 2C rates.

| Cathode | Li-metal C/5 capacity (mAh/g) | Li-ion cells C/5 capacity (mAh/g) | Li-ion cells 2C capacity (mAh/g) |
|---|---|---|---|
| LiCoO$_2$ | 104 ± 1 | 120 ± 2 | 88 ± 1 |
| 87:13 LiCoO$_2$:Li$_2$RuO$_3$ | 112 ± 2 | 123 ± 1 | 93 ± 1 |
| 58:42 LiCoO$_2$:Li$_2$RuO$_3$ | 125 ± 1 | 145 ± 1 | 123 ± 1 |
| Li$_2$RuO$_3$ | 136 ± 1 | 176 ± 1 | 107 ± 1 |

TABLE III

Specific energies calculated from the second discharge cycle of Li-metal and Li-ion cells with different cathode compositions at C/5 and 2C rates.

| Cathode | Li-metal C/5 capacity (mWh/g) | Li-ion cells C/5 capacity (mWh/g) | Li-ion cells 2C capacity (mWh/g) |
|---|---|---|---|
| LiCoO$_2$ | 416 ± 2 | 448 ± 3 | 301 ± 3 |
| 87:13 LiCoO$_2$:Li$_2$RuO$_3$ | 391 ± 3 | 456 ± 3 | 318 ± 3 |
| 58:42 LiCoO$_2$:Li$_2$RuO$_3$ | 456 ± 2 | 505 ± 3 | 411 ± 3 |
| Li$_2$RuO$_3$ | 489 ± 2 | 556 ± 3 | 326 ± 3 |

The Li-metal cells with physical mixtures of the LiCoO$_2$ and Li$_2$RuO$_3$ (FIGS. 2(c) and (d)) had discharge plateaus at both 3.8 and 3.3 V, reflecting a combination of the characteristic plateaus exhibited by each compound. However, analysis of the data indicates a 3-6% increase in capacity over the weighted average of the single component specific capacities. That is, instead of the expected 108 mAh/g, the 87:13 mix has a specific capacity of 112 mAh/g at C/5 and similarly 125 mAh/g instead of 117 mAh/g for the 58:42 mix; the experimental error is 2% (Table II).

The performance of the cathodes in Li-ion cells (FIG. 3) shows a similar trend with Li$_2$RuO$_3$ content as seen at C/5 with the cathodes in the Li-metal cells, exhibiting a greater discharge capacity with increasing amount of Li$_2$RuO$_3$ in electroactive materials. As in the Li-metal cells, the discharge profile of the Li-ion cells with 58:42 LiCoO$_2$:Li$_2$RuO$_3$ cathode appears to be a superposition of the discharge curves of the two different active materials. Additionally, as in the Li-metal cells, the capacity of the 58:42 blend is approximately 4% higher than expected from the weight-normalized capacities of the active materials.

Figure 4:
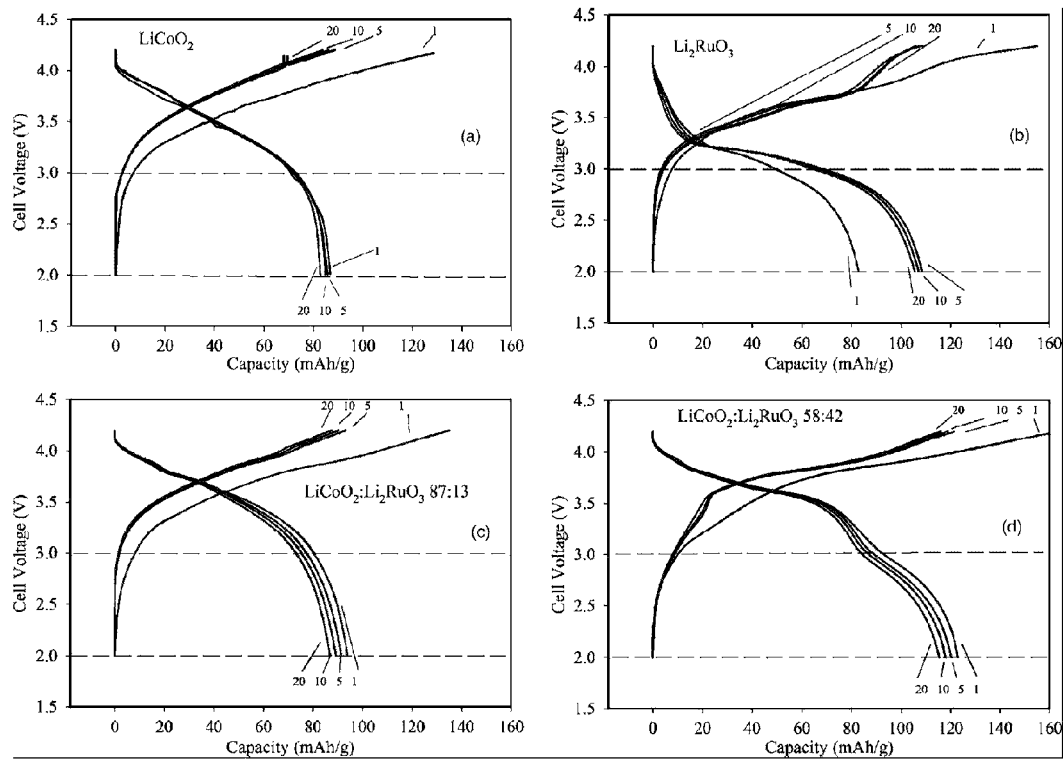
FIG. 4 shows charge-discharge characteristics for cycles 1, 5, 10, and 20 of Li-ion cells at 2C rate and electrodes containing (a) $LiCoO_2$, (b) $Li_2RuO_3$, (c) physical mixtures of 87:13 w/w $LiCoO_2$ and $Li_2RuO_3$, and (d) 58:42 w/w $LiCoO_2$ and $Li_2RuO_3$.
Figure 5:
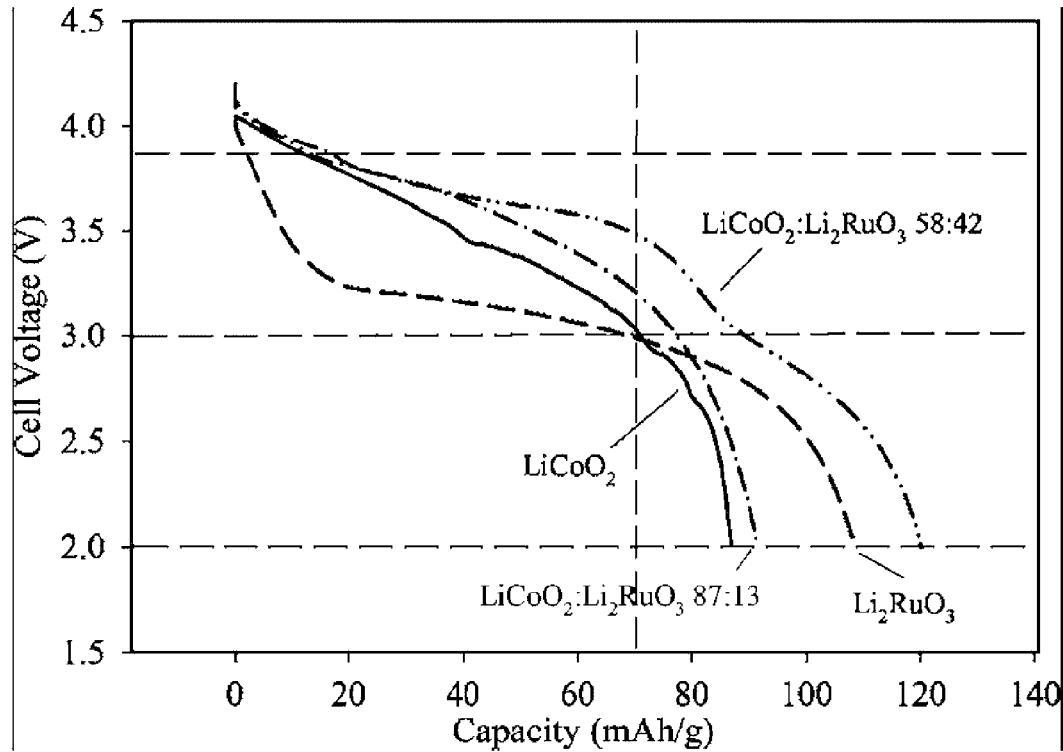
FIG. 5 shows fifth discharge profile of Li-ion cells at 2C rate with cathodes containing $LiCoO_2$ (solid line), $Li_2RuO_3$ (dash), and physical mixtures of $LiCoO_2$ and $Li_2RuO_3$ 87:13 w/w (dash dot), and 58:42 w/w (dash dot dot). Dashed lines are provided for 3.87, 3.0, and 2.0 V and 70 mAh/g as a guide for the eye

When current was increased from a C/5 to 2C rate, the loss of capacity and energy of the 58:42 blend was not as high as in the case of single-component electrodes, as shown by the data in FIG. 4 and Table II. The LiCoO$_2$ had a discharge capacity of approximately 88 mAh/g at the fifth cycle. The Li$_2$RuO$_3$ started with a discharge capacity of 82 mAh/g, but then it increased to 107 mAh/g with subsequent cycles. The 87:13 mix had a capacity of 93 mAh/g. However, the discharge capacity at 2C for the 58:42 mix LiCoO$_2$/Li$_2$RuO$_3$ was 123 mAh/g, which is not only greater than the weighted average of the specific capacities but is also greater than the discharge capacity of the single-component Li$_2$RuO$_3$. In contrast, at C/5 rates, neither of the LiCoO$_2$/Li$_2$RuO$_3$ blends in FIGS. 3(c) and (d) exceeds the Li$_2$RuO$_3$ capacity in FIG. 3(b). A small addition of Li$_2$RuO$_3$ to the cathode recipe, as demonstrated by the 87:13 mix, results in a slight increase in specific capacity over LiCoO$_2$ for both cycling rates, 93 vs. 88 mAh/g at 2C as in FIGS. 4(c) and (a), and also 123 vs. 120 at C/5 as in FIGS. 3(c) and (a). The specific capacity increase with the 87:13 blend was slightly higher at 2C than the C/5 rate.

The results of the Li$_2$RuO$_3$/LiCoO$_2$ 58:42 blend indicate that the Li$_2$RuO$_3$ component made a greater contribution to capacity at the 2C rate than at the C/5 rate. The contribution of Li$_2$RuO$_3$ to capacity therefore depends on cycling rate. The improvement in capacity at this high rate can be observed visually in FIG. 5, which overlays the fifth discharge cycle for the four different electrodes and clearly shows that the 58:42 blend combines the high discharge voltage of the LiCoO$_2$ with the high capacity of the Li$_2$RuO$_3$.

The predicted and measured values for the specific energy and capacity are depicted by the graph in FIG. 6. A linear increase in the normalized capacity of the cathodes is anticipated with the addition of the higher capacity Li$_2$RuO$_3$ to the LiCoO$_2$. However, the capacity (FIG. 6(a)) and specific energy (FIG. 6(b)) of the 58:42 mixture are disproportionately large when the batteries are cycled at the 2C rate.

Figure 7:
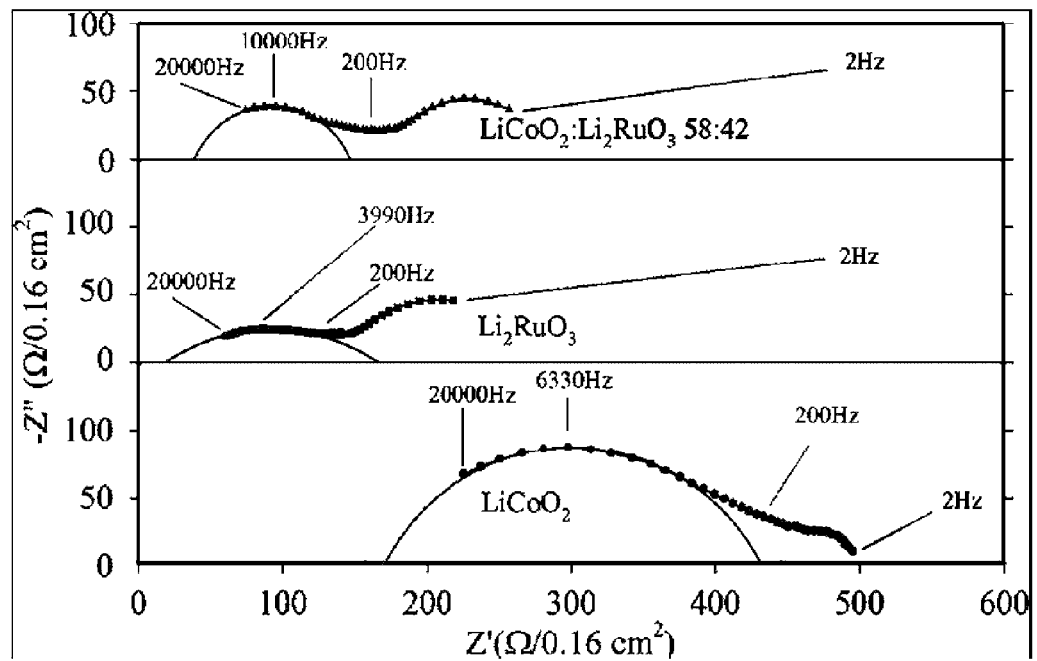
FIG. 7 shows impedance spectra for Li-ion cells charged to approximately 4 V with cathodes comprising single-component $LiCoO_2$ (circles), $Li_2RuO_3$ (squares), and a 58:42 w/w $LiCoO_2$ and $Li_2RuO_3$ (triangles). Circular fits are shown for comparison

The impedance spectra in FIG. 7 show that the charged batteries with LiCoO$_2$ electrodes had higher impedance than those with Li$_2$RuO$_3$ or the 58:42 blend. The curvature is smaller in the case of LiCoO$_2$ than those of the Li$_2$RuO$_3$ and Li$_2$RuO$_3$/LiCoO$_2$ cathodes, indicating a higher resistance. This same trend was observed when the battery impedance is tested at 3.8 and 3.0 V.

Figure 8:
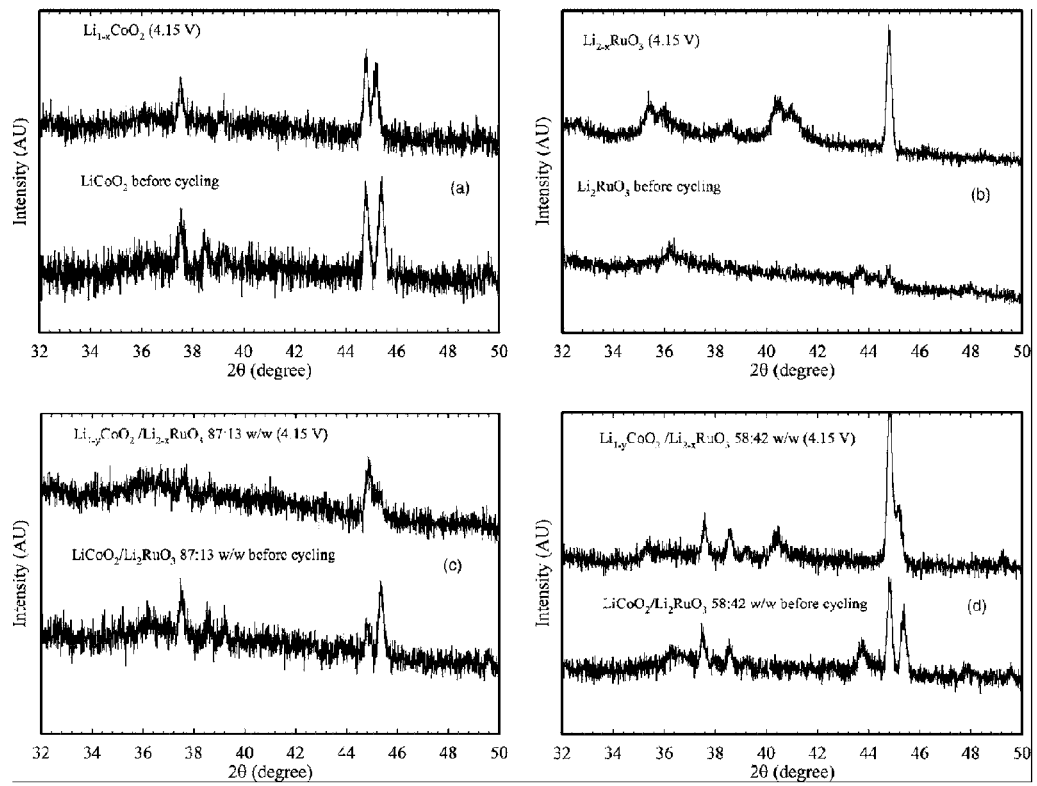
FIG. 8 shows XRD patterns of Kapton-encapsulated electrodes before cycling (bottom) and at 4.15 V (top). The represented electrodes all contain carbon, PVDF, but different active materials: (a) $LiCoO_2$, (b) $Li_2RuO_3$, (c) 87:13 w/w $LiCoO_2/Li_2RuO_3$, and (d) 58:42 w/w $LiCoO_2/Li_2RuO_3$.

Expanded views of the XRD patterns of as-prepared and charged cathodes are shown in FIG. 8. The deintercalated electrodes of LiCoO$_2$ in FIG. 8(a) exhibit the expected shifts in the LiCoO$_2$ peaks from 45.1 to 45.5° 2θ due to the change in the (104) reflection. (Reimers et al., *J. Electrochem. Soc.*, 139, 2091 (1992). Changes to the Li$_2$RuO$_3$ structure, indicated by additional peaks near 40° in FIG. 8(b), are also consistent with those previously reported. (Kobayashi et al., *Solid State Ionics*, 82, 25 (1995) The rearrangement from cubic close-packed to hexagonal close-packed structures has been attributed to lithium deintercalation from the all-lithium layer of occupied octahedral sites, and is exhibited in the appearance of the (202) peak at 44.6° 2θ. The data in FIGS. 8(c) and (d) show that the same peak changes present in the single-component LiCoO$_2$ and Li$_2$RuO$_3$ cathodes upon deintercalation are also present in the composite electrodes, suggesting that there is no physical interaction between the two phases as a result of charging and discharging. That is, the respective electrochemical Li$^+$ insertion processes have similar effects on the structure of each material whether as a mixture or as a single component. Therefore, these electrochemical processes may be distinct.

The assumption that the LiCoO$_2$ and Li$_2$RuO$_3$ serve as resistors in parallel in the blend is supported, as the IR loss (R$_L$) values for LiCoO$_2$ and Li$_2$RuO$_3$ in Table IV yield a weighted resistance average of 2190Ω, which is within 14% of the actual value of 1880 Ω measured from the voltage plateau of the blend $$\left[0.58\left(\frac{1}{6530}\right) + 0.42\left(\frac{1}{1140}\right)\right]^{-1} = 2190 \qquad (3)$$

The materials are compared at a discharge capacity of 70 mAh/g because the LiCoO$_2$ component of the blend is still a contribution to the IR, and the relevant value of 3.4 V used for Li$_2$RuO$_3$ in the calculations has validity. For selected capacities closer to the cutoff of 88 mAh/g for LiCoO$_2$, the discrepancy between calculated and measured resistances (using tabulated values from the discharge curves as in the method demonstrated in Table IV and Eq. 2) is even smaller than for 70 mAh/g. For example, with 80 mAh/g the discrepancy between the calculated and measured resistance of the blend is only 6%.

The resistance values were also measured for the LiCoO$_2$, Li$_2$RuO$_3$, and 58:42 blend by EIS and are reported in Table IV. In EIS of two-electrode cells, the curvature of the first impedance arc can provide information about charge-transfer resistances while the high-frequency point of the arc is due to Ohmic resistance (FIG. 7). Thus, the EIS studies can be used as a comparison for the different electrodes in this study.

As above, from the resistances measured from EIS (R$_{EIS}$) for LiCoO$_2$ and Li$_2$RuO$_3$ and using a weighted average, a resistance of 205Ω is predicted $$\left[0.58\left(\frac{1}{270}\right) + 0.42\left(\frac{1}{154}\right)\right]^{-1} = 205 \qquad (4)$$

which is nearly double the measured value of 111Ω. The resistance of the blended cathode is clearly lower than that of the single component electrodes, as determined both from the IR drop of the discharge curves and from EIS, thereby confirming that the two materials serve as a parallel combination of Li-ion insertion materials. The discrepancy between the measured and calculated resistances from EIS is likely a result of measuring impedance on full cells, which makes it difficult to isolate the contribution of the cathode. Still, it is a direct comparison to similar cells used in other methods of characterization use herein.

The model for parallel resistors is further supported by the observed increase in the capacity with increasing Li$_2$RuO$_3$ content of the electrodes. The 87:13 blends of LiCoO$_2$ and Li$_2$RuO$_3$ show a smaller response to increased rate than the 58:42 blend, presumably because the concentration of Li$_2$RuO$_3$ is below the volumetric percolation threshold for connectivity throughout the electrode. This helps explain the 87:13 blended cathodes having only a slightly greater specific capacity than pure LiCoO$_2$. The 58:42 blend has enough of both the Li$_2$RuO$_3$ and LiCoO$_2$ for the resistors to exist in parallel, resulting in a significant change of observed capacities.

TABLE IV

IR loss (R$_L$) in batteries with cathodes of LiCoO$_2$, Li$_2$RuO$_3$, and 58:42 LiCoO$_2$:Li$_2$RuO$_3$ after discharging to 70 mAh/g (data extracted from FIG. 5), and resistance of the batteries as measured by EIS.

| Active material | $V_1 = V_{redox\ (70\ mAh/g)}$ | $V_2 = V_{redox\ (70\ mAh/g)}$ | $V_1 - V_2$ | Current (μA) | IR loss (Ω) | R$_{EIS}$ from impedance (Ω) |
|---|---|---|---|---|---|---|
| LiCoO$_2$ | 3.87 | 3.06 | 0.81 | 125 | 6530 | 270 |
| Li$_2$RuO$_3$ | 3.4 | 2.99 | 0.41 | 360 | 1140 | 154 |
| 58:42 LiCoO$_2$: Li$_2$RuO$_3$ | 3.87 | 3.48 | 0.39 | 205 | 1880 | 111 |

Example 2

$LiCoO_2$:$LiMoO_2$

Figure 9:
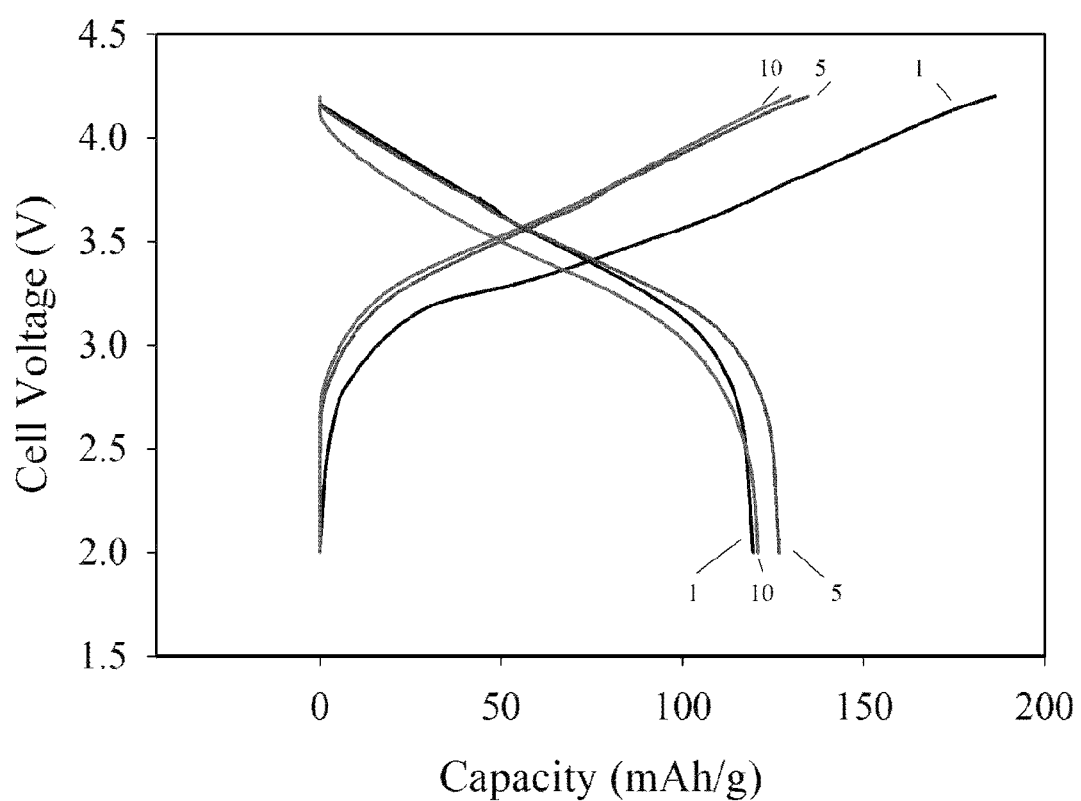
FIG. 9 shows charge-discharge characteristics for cycles 1, 5, and 10 of Li-ion cells at 2C rate and electrodes containing physical mixtures of 58:42 w/w $LiCoO_2$ and $LiMoO_2$.

A similar composite material of $LiCoO_2$/$LiMoO_2$ (58:42 by weight) was made and its performance as a Li-ion cell cathode was measured as described above. FIG. 9 shows the discharge profile.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed as new and desired to be protected by Letters Patent of the United States is:

1. A composite material comprising:
    particles of $LiCoO_2$;
    particles of $Li_2RuO_3$;
    a conductive matrix; and
    a polymeric binder;
        wherein the weight ratio of $LiCoO_2$ to $Li_2RuO_3$ is from about 60:40 to about 55:45;
        wherein the particles of $LiCoO_2$ are free of $Li_2RuO_3$; and
        wherein the particles of $Li_2RuO_3$ are free of $LiCoO_2$.
2. The composite material of claim 1, wherein the conductive matrix is carbon black.
3. The composite material of claim 1, wherein the polymeric binder is polyvinylidene fluoride.
4. An electrode comprising the composite material of claim 1.
5. A battery comprising:
    a cathode comprising the composite material of claim 1;
    an anode; and
    a lithium ion permeable separator between the cathode and the anode.
6. A method of powering a device comprising:
    providing the battery of claim 5; and
    connecting a load to the anode and the cathode.

* * * * *